US 12,296,858 B2

United States Patent
Morales Morales et al.

(10) Patent No.: US 12,296,858 B2
(45) Date of Patent: May 13, 2025

(54) HYBRID LOG SIMULATED DRIVING

(71) Applicant: Zoox, Inc., Foster City, CA (US)

(72) Inventors: Andres Guillermo Morales Morales, San Francisco, CA (US); Samir Parikh, Los Gatos, CA (US); Kai Zhenyu Wang, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/529,803

(22) Filed: Nov. 18, 2021

(65) Prior Publication Data
US 2023/0150549 A1 May 18, 2023

(51) Int. Cl.
*B60W 60/00* (2020.01)
(52) U.S. Cl.
CPC .. *B60W 60/00272* (2020.02); *B60W 60/0016* (2020.02); *B60W 60/0017* (2020.02); *B60W 2420/403* (2013.01); *B60W 2554/4049* (2020.02)
(58) Field of Classification Search
None
See application file for complete search history.

(56) References Cited

U.S. PATENT DOCUMENTS

| | | | | |
|---|---|---|---|---|
| 11,137,763 | B2* | 10/2021 | Heit | G06F 30/20 |
| 11,814,040 | B2* | 11/2023 | Hardå | B60Q 9/008 |
| 2017/0132334 | A1 | 5/2017 | Levinson et al. | |
| 2021/0166474 | A1* | 6/2021 | Behar | G06V 20/56 |
| 2021/0286925 | A1* | 9/2021 | Wyrwas | G06V 20/56 |
| 2022/0048533 | A1* | 2/2022 | Ödblom | G06F 11/3668 |
| 2022/0318464 | A1* | 10/2022 | Xu | G05D 1/0212 |
| 2023/0037071 | A1 | 2/2023 | Cunningham et al. | |

OTHER PUBLICATIONS

Office Action for U.S. Appl. No. 17/,529,866, filed May 6, 2024, 31 pages.

* cited by examiner

*Primary Examiner* — James J Lee
*Assistant Examiner* — David Hatch
(74) *Attorney, Agent, or Firm* — Lee & Hayes, P.C.

(57) ABSTRACT

Techniques for determining a response of a simulated vehicle to a simulated object in a simulation are discussed herein. Log data captured by a physical vehicle in an environment can be received. Object data representing an object in the log data can be used to instantiate a simulated object in a simulation to determine a response of a simulated vehicle to the simulated object. Additionally, one or more trajectory segments in a trajectory library representing the log data can be determined and instantiated as a trajectory of the simulated object in order to increase the accuracy and realism of the simulation.

20 Claims, 7 Drawing Sheets

HYBRID LOG SIMULATED DRIVING

BACKGROUND

Simulated data and simulations can be used to test and validate the features and functionalities of systems, including features and functionalities that may be otherwise prohibitive to test in the real world (e.g., due to safety concerns, limitations on time, repeatability, etc.). For example, autonomous vehicles and other moving vehicles may use driving simulations to test and improve passenger safety, vehicle decision-making, sensor data analysis, and route optimization. However, driving simulations that accurately reflect real-world scenarios may be difficult to create, as simulated agents may exhibit behavior that deviates or are inconsistent with their real-world counterparts.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
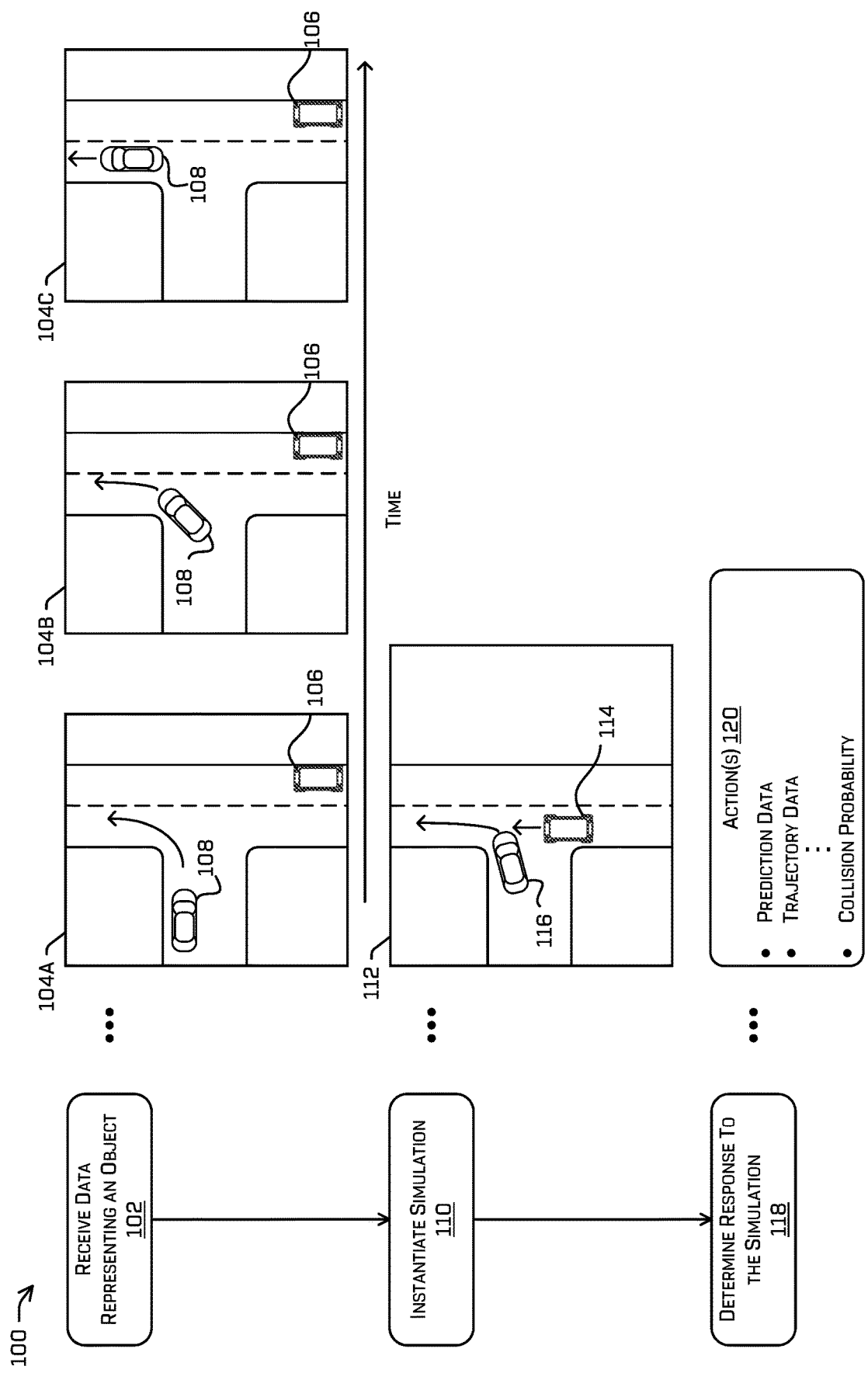
FIG. 1 is a pictorial flow diagram of an example process of determining a response of a vehicle to a simulation.

Techniques for simulating a vehicle operation using a hybrid log-based simulation are discussed herein. For example, log data can be captured by a vehicle as it traverses an environment. From the log data, data representing one or more objects can be determined, such as locations of objects, bounding boxes (and associated length, width, height, orientation, etc.), classification of objects, a trajectory of the object, a distance from the object, and the like. In some examples, data about the one or more objects can be extracted from the log data and can be instantiated in a simulation along with a simulated vehicle. In some examples, the simulation may execute a scenario whereby the simulated vehicle may perform an operation generally too dangerous to test in a real-world environment (e.g., a pedestrian suddenly crossing a roadway in front of the vehicle, thereby requiring the vehicle to perform emergency braking). In some examples, the operation of the simulated vehicle may be determining a maneuver or trajectory avoid a simulated object. In any event, a first location of the vehicle relative to the object in the physical environment can be different than a second location of the simulated vehicle relative to the object instantiated in the simulated environment. Accordingly, the simulated vehicle can be instantiated into the simulated environment to locations, orientations, velocities, and the like, relative to the actual log data representing the object that would otherwise be unfeasible in testing in a physical environment. Accordingly, a behavior or response of an autonomous vehicle or a vehicle controller can be determined and/or verified for controlling the autonomous vehicle, for example.

In some examples, an object instantiated in the simulated environment can be represented by log data captured by a single vehicle or can represent log data aggregated from data captured by multiple vehicles or data representing multiple objects. That is, log data of an object can be broken into trajectory segments and used to populate a trajectory library that represents a variety of motion from a variety of objects. For example, a first trajectory segment can represent a first object traversing in a straight light and a second segment can represent a second object changing lanes. When instantiating a simulated trajectory of an object, the first segment and the second segment can be combined and the log data associated with the segments can be used in a simulation to represent motion of an object. Accordingly, a trajectory library of trajectory segments can be used to generate any arbitrary trajectory for a simulated object to traverse while allowing actual log data to be used to represent the simulated object, rather than simulated log data. Accordingly, the simulated autonomous vehicle controller can be tested using real log data to provide a realistic testing environment.

When a physical vehicle traverses a physical environment, the physical vehicle may generate log data associated with the environment. This log data may capture nuances that may be difficult to simulate (e.g., environmental conditions that may affect sensor readings, uncertainties and variations thereof in detected object positions, variations in sensor readings do to real world object variations (e.g., scratches, dents, clothing, etc.), etc.). Use of the log data can provide a more realistic representation of perceived objects and trajectories than may otherwise be simulated. In some examples, the physical vehicle may be an autonomous vehicle. In some examples, log data may include raw sensor data and/or data based on sensor data (e.g., bounding boxes, velocities, classifications, object dimensions, predictions, object track information, control signals, etc.). Examples of sensors that generate sensor data may include, but are limited to, time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, or the like. Additionally or alternatively, the log data may include maneuvers and trajectories performed by the physical vehicle.

In some examples, the physical vehicle may generate log data as it traverses a physical environment during its normal operations. In some examples, the physical vehicle may generate log data of real-world objects while stationary (e.g., in a parking lane) as object data. For example, the physical vehicle may be stationary at a parking lane of a roadway and generating sensor data of a second vehicle making a turn into the roadway at a distance from the physical vehicle. In some examples, the physical vehicle may be at a lane in the roadway different from the lane that the second vehicle turns into. In some examples, the physical vehicle may be in the same lane as the lane that the second vehicle turns into. In some examples, the real-world object may be a pedestrian or another object (e.g., falling tree, biker, an object blown into the roadway by the wind, and the like) that appears in the roadway ahead of the physical vehicle. In some examples, the real-world object may appear in the roadway after being occluded by a second real-world object (e.g., a pedestrian stepping out into the street from behind a parked vehicle).

In some examples, a simulated object may be instantiated in a simulated environment based on the object data (e.g., a simulated vehicle making a turn into a roadway). That is, the object data, as captured by the physical environment, can be instantiated in the simulated environment. In some examples, a simulated autonomous vehicle may be instantiated in the simulated environment in any arbitrary position. For example, the simulated autonomous vehicle can be instantiated in the simulated environment to perform an operation generally too dangerous to test in a real-world environment. Further, the simulated autonomous vehicle can use the object data as captured in the physical environment to determine operations in the simulated environment. For example, the simulated autonomous vehicle may be instantiated in a lane close to a simulated second vehicle turning into the lane, and thereby requiring the simulated autonomous vehicle to perform an emergency maneuver to avoid a collision. In some examples, application of such a simulation may be used to test and/or verify a response of a vehicle or a response of one or more systems of the vehicle. In some examples, application of such a simulation may be used create realistic scenarios to test and/or verify the response of the vehicle.

In some examples, trajectories of the real-world objects may be stored in a trajectory library. In some examples, the trajectories may be stored in the trajectory library as is. In some examples, the trajectories may be disassembled into segments prior to being stored in trajectory library, wherein a segment may be independently instantiable in a simulation. In some examples, the trajectories in the trajectory library may be categorized, indexed, or clustered based on attributes such as type of maneuver, distance from a vehicle, size of the object, road type, angle of an object relative to the environment, speed limits, velocity of the object, degree of similarity between road condition or the environment when recording the log data and the simulated environment, and the like.

In some examples, one or more trajectories from the trajectory library may be used to instantiate trajectories of the simulated object. In some examples, multiple trajectories from the trajectory library may be assembled together to form one contiguous trajectory of the simulated object. In some examples, the trajectories assembled together may be based on common attributes such as distance from a vehicle, size of the object, road type, type of object, road condition, road topography, angle of an object relative to the environment, velocity of the object, a velocity profile of the object, speed limits, degree of similarity between the road condition or the environment when recording the log data and the simulated environment, and the like. In some examples, the trajectory need not be instantiated with the same direction or length as in the trajectory library and may be adjusted to fit the needs of a simulation scenario and/or other trajectories from the trajectory library. In some examples, such adjustment may be, but are not limited to adjusting a length of the trajectory (e.g., lengthening or shortening the trajectory), adjusting an orientation of the trajectory, adjusting a curve of the trajectory (e.g., having the trajectory be more curved or less curved), and the like.

The purpose of instantiating the simulated environment can be to test and validate systems of a vehicle traversing an environment. In some examples, driving simulations may be used to test individual components or systems of the simulated vehicle (e.g., a lidar sensor, a radar sensor, or an image sensor), while other driving simulations may test the simulated vehicle as a whole including interactions between the various components or systems of the vehicle. Such simulations may comprise scenarios which rarely occur in the real world, yet still require testing to validate safe operation, as well as scenarios which frequently occur in the real world.

In some examples, a driving simulation system may instantiate a virtual driving simulation, in which a simulated vehicle may interact with a simulated objects in a simulated environment. In the virtual driving simulations, the simulated objects within the simulated environment may include software-based objects including artificial intelligence(s) and/or other algorithms that can react to the actions of simulated vehicle, while the simulated vehicle also reacts to the simulated objects and to the conditions of the simulated environment. In some examples, virtual simulations may provide highly realistic testing and validation for real-world driving scenarios, by executing all of the simulated components (e.g., simulated vehicle(s), objects, and environment) concurrently within the virtual environment and supporting communications and interactions between the simulated components. In some examples, virtual simulations may provide testing and validation for real-world driving scenario using individual simulated components or systems.

In some examples, the driving simulation system can perform the virtual driving simulation as a hybrid log-based simulation. In some examples, the hybrid log-based simulation may use the previously captured log data to generate simulated objects and trajectories for simulated objects. In some examples, the hybrid log-based simulations may rely on previously recorded sensor data from a system operating in an environment, such as an autonomous vehicle traversing an environment, to provide driving simulation scenarios for testing and validation purposes.

To generate a hybrid log-based simulation, the physical vehicle that initially collected the log data can transmit the log data, via a network, to a database that stores log data and/or to a computing device executing a scenario generator. As discussed above, the log data can include perception data that identifies objects (e.g., roads, sidewalks, road markers, signage, traffic lights, other vehicles, pedestrians, cyclists, animals, etc.), bounding boxes that represent the objects, and/or its trajectories. A scenario generator can use the log data to generate simulation instructions to simulate a scenario. For example, the environment (e.g., roads, buildings, signage, etc.) traversed by the vehicle can be represented as a simulated environment in the simulated scenario. The simulated scenario can be similar to or identical to the captured environment or deviate from the captured environment. In some examples, the simulated environment can have more or fewer number of objects as in the captured environment. In some examples, the objects may be the similar to or identical to the objects from the log data or may deviate from the log data. In some examples, deviation of the object from the log data can include a position of the object in the simulated environment, a type of the object, a classification of the object, an orientation of the object, a pose of the object, a velocity of the object, and the like. In some examples, the objects may have trajectories that are the same as those captured by the log data. In some examples, the trajectories of the objects may be assembled from a trajectory library. In some examples, the trajectory library may include trajectories from the log data. In some examples, the scenario generator can instantiate a simulated vehicle in the simulated environment in a different position than the physical vehicle. In some examples, the hybrid log-based simulation may be used to test and/or determine a behavior of a vehicle or a vehicle controller and/or other vehicle components.

Techniques for generating a hybrid log-based simulation in simulating a vehicle operation can improve the functions of a vehicle by providing a robust method of testing and/or determining a response of a vehicle can improve the safety of vehicle operations without subjecting the vehicle to unnecessary and dangerous real world driving scenarios. When a simulated object is instantiated with synthetic data (e.g., procedurally generated data), its characteristics may exhibit behaviors that does not correspond to real world behaviors (e.g., the simulated object performing a sharp turn that a physical object cannot perform). This may result in the vehicle making inaccurate predictions about the simulated object. Using real world log data to instantiate the simulated object can improve the realism of the simulation (e.g., the simulated object performing a turn the same way that a physical object makes), and thereby allowing for the vehicle to make accurate predictions about the simulated object. Furthermore, the ability to use multiple trajectory segments from a trajectory library to form a trajectory of the simulated object allows the simulation to instantiate the trajectory of the simulated object that is more of an exact match to a desired trajectory than fitting a whole trajectory from log data.

The methods, apparatuses, and systems described herein may be implemented in a number of ways. Example implementations are provided below with reference to the following figures. Although discussed in the context of an autonomous vehicle, in some examples, the methods, apparatuses, and systems described herein may be applied to a variety of systems. In another example, the methods, apparatuses, and systems may be utilized in semi-autonomous or non-autonomous vehicles, and/or in an aviation or nautical context.

FIG. 1 illustrates an example process 100 of determining a response of a vehicle to a simulation.

Figure 4:
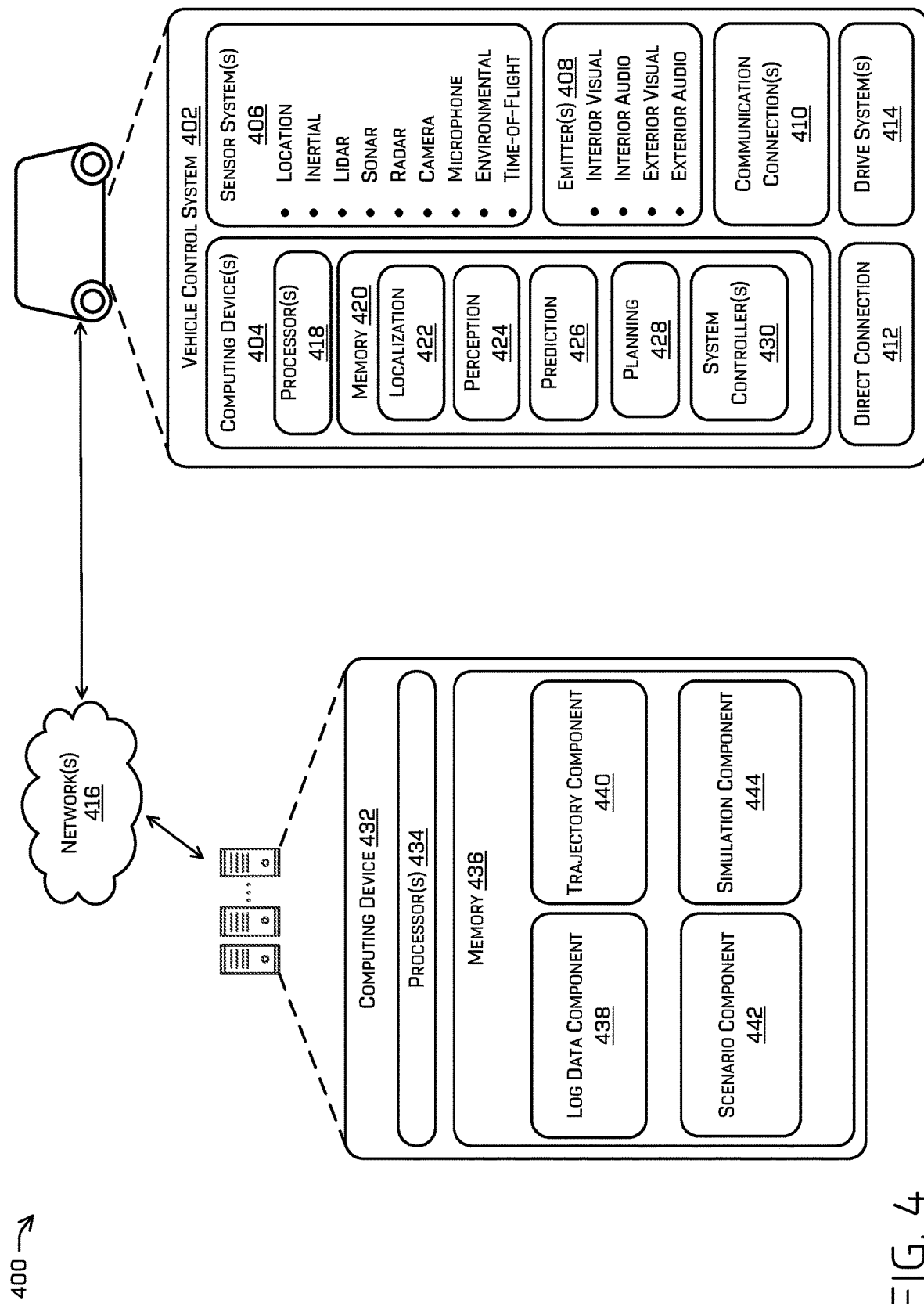
FIG. 4 includes a block diagram of an example architecture of a vehicle control system and a computing system for performing driving simulations, as described herein.

At operation 102, a computing system and/or device may receive data representing an object in an environment. In some examples, the data representing the object in the environment may be from log data by a vehicle in the environment. In some examples, data representing the object in the environment may be collected by one or more stationary objects or sensor configuration such as a traffic camera, a dash camera, and the like. In some examples, the log data may include raw sensor data of one or more sensors associated with the vehicle and/or data based on the raw sensor data. In some examples, the computing system and/or device may be the same or similar computing system and/or device as computing device 432 or the computing device as illustrated in FIG. 4. In some examples, the vehicle may be an autonomous vehicle, an unmanned aerial vehicle, a cargo delivery van, and the like. Examples of capturing log data of a vehicle may be found, for example, in U.S. patent application Ser. No. 17/210,101 titled "Fleet Dashcam System for Autonomous Vehicle Operation" and filed Mar. 23, 2021, the entirety of which is herein incorporated by reference in its entirety for all purposes. An example of the vehicle operating in the environment and generating log data is illustrated in examples 104A-C. Example 104A-C illustrates an example driving scenario where a first physical vehicle 106 (e.g., that may be stationary) observes second physical vehicle 108 turning into a different lane in a roadway that first physical vehicle 106 occupies. Example 104A illustrates when second physical vehicle 108 starts the turn. Example 104B illustrates when second physical vehicle 108 is in the middle of the turn. Example 104C illustrates when second physical vehicle 108 completes the turn. Alternatively, in some examples, first physical vehicle 106 may be in the same lane that second physical vehicle 108 turns into when observing second physical vehicle 108. In some examples, first physical vehicle 106 may be traversing through the environment rather than being stationary. In some examples, second physical vehicle 108 may be a vehicle that is traversing normally through a real-world environment. In some examples, second physical vehicle 108 may be a vehicle operating within a controlled environment. In some examples, both first physical vehicle 106 and second physical vehicle 108 may be autonomous vehicles. In some examples, second physical vehicle 108 may be manually controlled.

In some examples, data representing the object may include characteristics determined by a perception system associated with first physical vehicle 106, such as perception component 424 as illustrated in FIG. 4. Examples of the characteristic(s) may include, but are not limited to, a bounding box (e.g., a 3-D bounding box), velocity data, acceleration data, uncertainty data (e.g., covariance data, confidence level, uncertainty of a perception system, and the like), classification data, segmentation data, and the like. In some examples, second physical vehicle 108 may be partially or wholly occluded. In some examples, such occlusion may be included within the log data as first physical vehicle 106 observes second physical vehicle 108 and used when instantiating second physical vehicle 108 within a simulated environment. In some examples, data associated with second physical vehicle 108 may correspond to observations by various sensor components of first physical vehicle 106.

In some examples, first physical vehicle 106 may observe and generate log data on multiple objects in the environment such as multiple vehicles or multiple pedestrians crossing a crosswalk. In some examples, first physical vehicle 106 may generate log data based on interactions between the objects. In some examples, such recorded interactions between objects in the environment may be used to instantiate more realistic and/or accurate simulations.

In some examples, as first physical vehicle 106 is monitoring second physical vehicle 108 to generate log data, first physical vehicle 106 may generate prediction data associated with second physical vehicle 108, where first physical vehicle 106 predicts an action of second physical vehicle 108. In some examples, the prediction data may be based on an attribute of second physical vehicle 108 such as its orientation, its velocity, its size, its type, its pose, and the like. In some examples, if the prediction data differs from the actual trajectory of first physical vehicle 106, then the difference may be indexed within the log data or at another location such at a remote computing device. For example, as first physical vehicle 106 observes second physical vehicle 108, before second physical vehicle 108 makes its turn (e.g., at example 104A), first physical vehicle 106 may generate prediction data that predicts second physical vehicle 108 the right lane of the roadway. However, in actuality, first physical vehicle 106 observes second physical vehicle 108 turns into the left lane as illustrated in examples 104B and 104C. This difference between what first physical vehicle 106 predicts and what first physical vehicle 106 observes may be indexed as part of the log data.

At operation 110, the process can include instantiating a simulation based on the received data representing the object as described in operation 102. Example 112 illustrates an example simulation where second simulated vehicle 116 is performing a turn and first simulated vehicle 114 is positioned close to second simulated vehicle 116 with its trajectory on a collision course with second simulated vehicle 116. Example 112 includes a first simulated vehicle 114 and second simulated vehicle 116. In some examples, the distance between first physical vehicle 106 and second physical vehicle 108 may be greater than the distance between first simulated vehicle 114 and second simulated vehicle 116. In some examples, the pose of the second simulated vehicle 116 may be different from the pose of the second physical vehicle 108.

In some examples, first simulated vehicle 114 may correspond to the same or similar type of vehicle as vehicle 106. In some examples, second simulated vehicle 116 may correspond with second physical vehicle 108. In some examples, example 112 may be a hybrid log-based simulation where the simulated environment and second simulated vehicle 116 are instantiated from log data while first simulated vehicle 114 may be instantiated through procedural generation based on a machine learned model, user input, and the like. In some examples, first simulated vehicle 114 may be an autonomous vehicle controller that, in turn, reacts to the simulated environment in which it is placed.

In some examples, second simulated vehicle 116 may be instantiated according to the log data as illustrated in examples 104A-C. In some examples, second simulated vehicle 116 may be instantiated at a location different (or road topology) from the location of second physical vehicle 108. In some examples, second simulated vehicle 116 may be associated with a trigger location and/or trigger distance from first simulated vehicle 114 such that second simulated vehicle 116 proceeds along its trajectory once first simulated vehicle 114 passes the triggered location or the distance between first simulated vehicle 114 and second simulated vehicle 116 becomes less than the trigger distance.

In some examples, the trajectory of second simulated vehicle 116 may be adjusted or perturbed. Examples of such adjustment or perturbation may be, but not limited to, adjusting a length of the trajectory, adjusting a time interval associated with the trajectory, adjusting a velocity associated with the trajectory, adjusting a curvature associated with the trajectory (e.g., a yaw rate), and the like. In some examples, such adjustments may not exceed a threshold away from the actual, captured data represented by the trajectory segment. In some examples, the threshold may be associated with or based at least in part on a kinematic profile. For example, a velocity associated with a turning trajectory may not be adjusted to exceed a certain speed limit. In some examples, the kinematic profile of the trajectory of second 116 may be verified prior to instantiation in simulation. In some examples, the trajectory of second simulated vehicle 116 may be adjusted due to differences between the location of second physical vehicle 108 in the environment and a location of second simulated vehicle 116 in the simulated environment.

At operation 118, the process can include determining a response of a vehicle to the simulation. In some examples, the process can include determining the response of first simulated vehicle 114 to its trajectory being on a collision course with second simulated vehicle 116 as second simulated vehicle 116 makes its turn into a roadway. In some examples, the response of first simulated vehicle 114 may be one or more actions it takes to mitigate the collision. Examples of such actions are illustrated as example actions 120. Example action 120 can include, but are not limited to, determining and/or confirming the prediction data, determining a simulated trajectory of the simulated autonomous vehicle, determining a collision probability, determining a time to collision metric, and the like. In some examples, the determined simulated trajectory of the simulated autonomous vehicle may be a planned simulated trajectory not selected by first simulated vehicle 114 or a planned simulated trajectory selected by first simulated vehicle 114. In some examples, first simulated vehicle 114 can include a planner system configured to control first physical vehicle 106.

If the behavior of the simulated autonomous vehicle is validated, the operation 118 can include transmitting an autonomous vehicle controller, such as the planner system of first simulated vehicle 114, to an autonomous vehicle to control the autonomous vehicle. In some examples, an operation of the autonomous vehicle controller can be verified or validated if a safety metric is satisfied, such as a distance between the vehicles 114 and 116 being above a threshold, a time to collision being above a threshold, a probability of collision being below a threshold, and the like. In some examples, transmitting the autonomous vehicle controller to the autonomous vehicle may include transmitting an autonomous vehicle controller of first simulated vehicle 114 to first physical vehicle 106.

Figure 2:
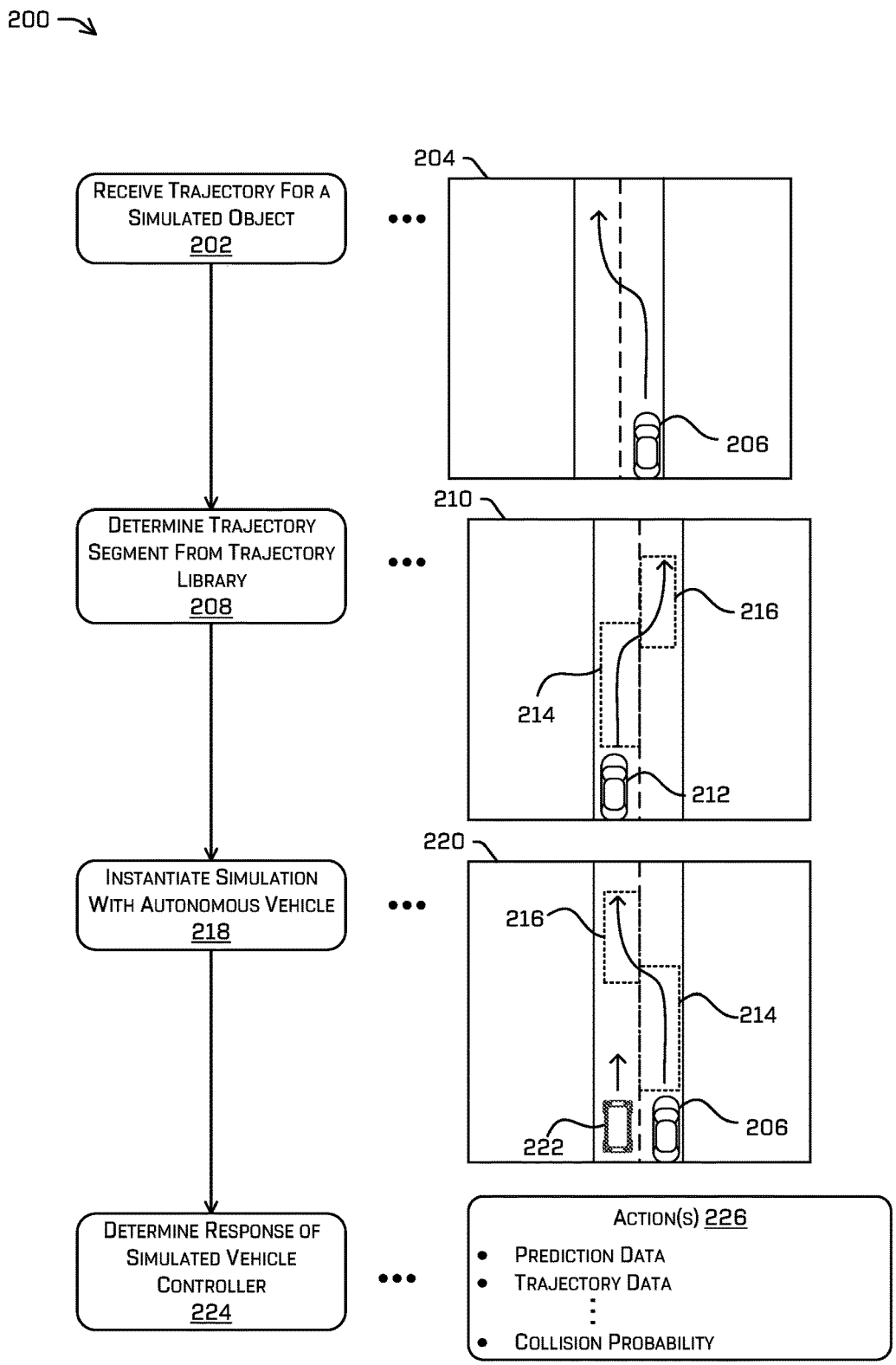
FIG. 2 is a pictorial flow diagram of an example process of determining a response of a simulated vehicle controller in a simulated environment.

FIG. 2 illustrates an example process 200 of determining a response of a simulated vehicle controller in a simulated environment including an object instantiated based on a trajectory library.

At operation 202, the process can include receiving a trajectory for a simulated object to follow in a simulation. In some examples, the trajectory may be user defined (e.g., dragging and dropping one or more trajectory segments by the user, hand selected or hand drawn by the user) and/or can be any arbitrary trajectory for an object to take in an environment. Examples of dragging and dropping can be from a library of trajectories to be matches to a selected object and/or objects with trajectories to be inserted into a simulation. In some examples, a trajectory can be based on map segments or actions or scenarios to be tested. In some examples, the trajectory may be defined based on a driving scenario.

By way of example, and without limitation, a trajectory can be determined based on log data received from a dash cam installed in a delivery van. For example, as discussed in U.S. patent application Ser. No. 17/210,101, the entirety of which is herein incorporated by reference in its entirety for all purposes, dash cam(s) may be installed in vehicles of a fleet of vehicles to capture sensor data of an environment. In some examples, the dash cam may provide video data and/or accelerometer data. However, the dash cam may not include a complete sensor suite as implemented in an autonomous vehicle (e.g., the vehicle 402). In such an example, log data from the dash cam can be used to determine a trajectory for a simulated object to traverse. That trajectory can be used as the basis or template for which to search a trajectory library for trajectory segments that represent log data associated with rich vision, lidar, radar, and the like. Accordingly, video-based log data can be converted to detailed sensor data representing objects in an environment and simulated, as discussed herein. Dash cam sensor information can be completed by, for example, associating it with a road network or other environment based on location data corresponding to a log captured by the dash cam. In some examples, a scenario or road type can be inferred from data captured by a sensor of a dash cam. In this manner, object data captured by a dash cam can be associated with a specific or type of road network segment or environment.

Example 204 illustrates an example trajectory for a simulated object to follow. Example 204 illustrates a simulated object 206, which in example 204 is a vehicle, following a lane change trajectory. In some examples, simulated object 206 may be a simulated autonomous vehicle controller of physical vehicle 108 of Examples 104A-C. In some examples, operation 202 can further include receiving an attribute of the simulated object. Examples of the attribute of the simulated object may include, but is limited to, an type of the simulate object, a size of the simulated object, a velocity of the simulated object, a weather condition associated with the object; a road type associated with the simulated object, a road condition associated with the simulated object, and the like.

At operation 208, the process can include determining, based on the attributed of the simulated object and the trajectory for the simulated object to follow, one or more trajectory segments from a trajectory library. In some examples, the trajectory library may be a database that aggregates trajectory data from log data of different vehicles. In some examples, the one or more trajectory segments may be extracted and separated from the log data to only include data about a physical object. For example, in FIG. 1, when first physical vehicle 106 generates log data of second physical vehicle 108, the log data may include the trajectory of second physical vehicle 108. The trajectory of second physical vehicle 108 may be extracted from the log data, and may be separated into multiple trajectory segments. In some examples, trajectory segments within the trajectory library may be categorized, grouped, or clustered by at least one of, but not limited to, a type of vehicle associated with the trajectory segment, a wheelbase size of the vehicle associated with the trajectory segment, a type of the road associated with the trajectory segment, a condition of the road associated with the trajectory segment, a topography of the road associated with the trajectory segment, a velocity associated with the trajectory segment, maneuver type (e.g., right turn, left turn), a distant from the physical vehicle that generated the log data, environmental condition (e.g., weather condition), curvature of the trajectory segment, and the like. Trajectories within the trajectory library may be discretized and/or disassembled into smaller trajectory segments wherein a trajectory segment may be independently instantiated in simulation. In some examples, a trajectory from log data may remain whole but any portion of a trajectory can be sampled and combined with portion(s) of any other trajectories in order to generate any arbitrary trajectory for a simulation, as discussed herein.

In some examples, a trajectory of an object may be instantiated in a simulation by combining multiple trajectory segments. In some examples, a trajectory and/or a trajectory segment within the trajectory library may be adjusted. Examples of such adjustment may include, but are not limited to, lengthening the trajectory (or trajectory segment), shortening the trajectory (or trajectory segment), changing an orientation of the trajectory (or trajectory segment), changing an angle of the trajectory (or trajectory segment) (e.g., a curvature of a turn), and the like.

Example 210 illustrates an example log data including vehicle 212 and its trajectory data. Vehicle 212 may correspond to second physical vehicle 108 of FIG. 1. The trajectory data of vehicle 212 may be stored inside the trajectory library. The trajectory data may be stored as is and/or stored in separate segments. Example 210 illustrates that the trajectory data of vehicle 212 may be stored in a first segment 214 and a second segment 216. First segment 214 and second segment 216 may be independently stored in the trajectory library, instantiated as independent trajectories in simulation, and may be independently manipulated and combined with each other or any other trajectory and/or trajectory segments in the trajectory library during simulation.

In some examples, in order to provide a more realistic and accurate vehicle simulation, rather than procedurally generating log data representing the lane changing trajectory in simulation, the lane changing trajectory may be instantiated using real-world log data from the trajectory library. In some examples, the trajectory library may not include a lane change trajectory where a vehicle changes from a right lane to a left lane as illustrated in example 204 or may not include the desired lane changing trajectory data. In those example, one or more trajectory or trajectory segments from the trajectory library such as first segment 214 and second segment 216 may be identified and combined into a lane change trajectory for simulation. In some examples, factors for determining which trajectory and/or trajectory segments within the trajectory library to use and/or combine in simulation may be, but are not limited to, distance from a vehicle, size of the object, road type, angle of an object relative to the environment, speed limits, velocity of the object, degree of similarity between road condition or the environment when recording the log data and the simulated environment, and the like.

At operation 218, the process can include instantiating in simulation the simulated object with the trajectory for the simulated object and with an autonomous vehicle. Example 220 illustrates such an example simulation. Example 220 includes simulated object 206 and its trajectory and simulated autonomous vehicle 222 and its trajectory. In some examples, the trajectory of simulated object 206 may be assembled from one or more trajectory segments of the trajectory library. In some examples, the trajectory of simulated object 206 may be assembled by combining first segment 214 and second segment 216. Because first segment 214 and second segment 216 may be independently adjusted, in example 220, first segment 214 and second segment 216 are in mirror positions from their originally real-world positions. Examples of such adjustments may be same or similar to those associated with operation 110. In some examples, first segment 214 comprise the first half of the lane change trajectory and second segment 216 may be adjusted to form the second half of the lane change trajectory. In some examples first segment 214 and second segment 216 may be further adjusted in order to match first segment 214 and second segment 216 with the received trajectory from example 204 and operation 202. In example 220, simulated autonomous vehicle 222 is instantiated in the simulation as being on a collision course with simulated object 206 once simulated object 206 completes its lane change trajectory.

In some examples, the trajectory received in the operation 202 may have a velocity profile or velocity data associated with the trajectory. In some examples, the velocity data can be used to determine a trajectory segment from the trajectory library, such that a velocity segment of the trajectory segment can be within a threshold value of the velocity data associated with the trajectory to be simulated. In some examples, first segment 214 and second segment 216 may have velocity profiles incompatible with which certain vehicle maneuvers. In some examples, because first segment 214 and second segment 216 are segments of a lane change trajectory, the velocity profile of first segment 214 and second segment 216 may be constant or include small changes (e.g., velocity difference of less than 5 miles per hour (although any threshold can be used)). Therefore, first segment 214 and second 216 may be incompatible with vehicle maneuvers that required velocity profile or velocity data associated with significant changes to the velocity of a vehicle (e.g., velocity difference of greater than 5 miles per hour such as a U-turn).

In some examples, the simulated environment of example 220 may include additional simulated objects. In some examples, simulated object 206 may interact with an additional simulated object. In some examples, such interaction may be necessary because the additional simulated object is positioned such that when simulated object 206 follows trajectory first segment 214 and second segment 216 as illustrated in example 220, it would result in a collision of the additional simulated object. In some examples, simulated object 206 may include a simulated object controller, which can adjust one or more operations of simulated object 206 in response to the additional simulated object. In some examples, the simulated object controller can base its response on a cost or collision probability exceeding a threshold, thereby indicating that simulated object 206 has a high likelihood of collision with the additional simulated object. In some examples, the simulated object controller can adjust the trajectory of simulated object 206 in response to the cost or collision probability exceeding the threshold by replacing first segment 214 and/or second segment 216 with one or more different trajectories and/or trajectory segments within the trajectory library. Examples of a simulated object interacting with the additional simulated object can be found, for example, in U.S. patent application Ser. No. 16/457,745 titled "Synthetic Scenario Simulator Based on Events" filed Jun. 28, 2019, the entirety of which is herein incorporated by reference in its entirety for all purposes.

At operation 224, the process can include determining a response of a simulated autonomous vehicle controller. In some examples, the simulated autonomous vehicle controller may be the same or similar to vehicle control system 402 illustrated in FIG. 4. In some examples, the process can include determining the response of the simulated autonomous vehicle controller as the simulated object 206 traverses along the trajectory comprising the trajectory segments 214 and 216. In some examples, the response may be one or more actions it takes to mitigate the likelihood of collision. Examples of such actions are illustrated as example actions 226. Example action 226 can include, but are not limited to, determining and/or confirming prediction data, determining a trajectory of the simulated autonomous vehicle, determining a collision probability, determine a time to collision metric, and the like.

Figure 3:
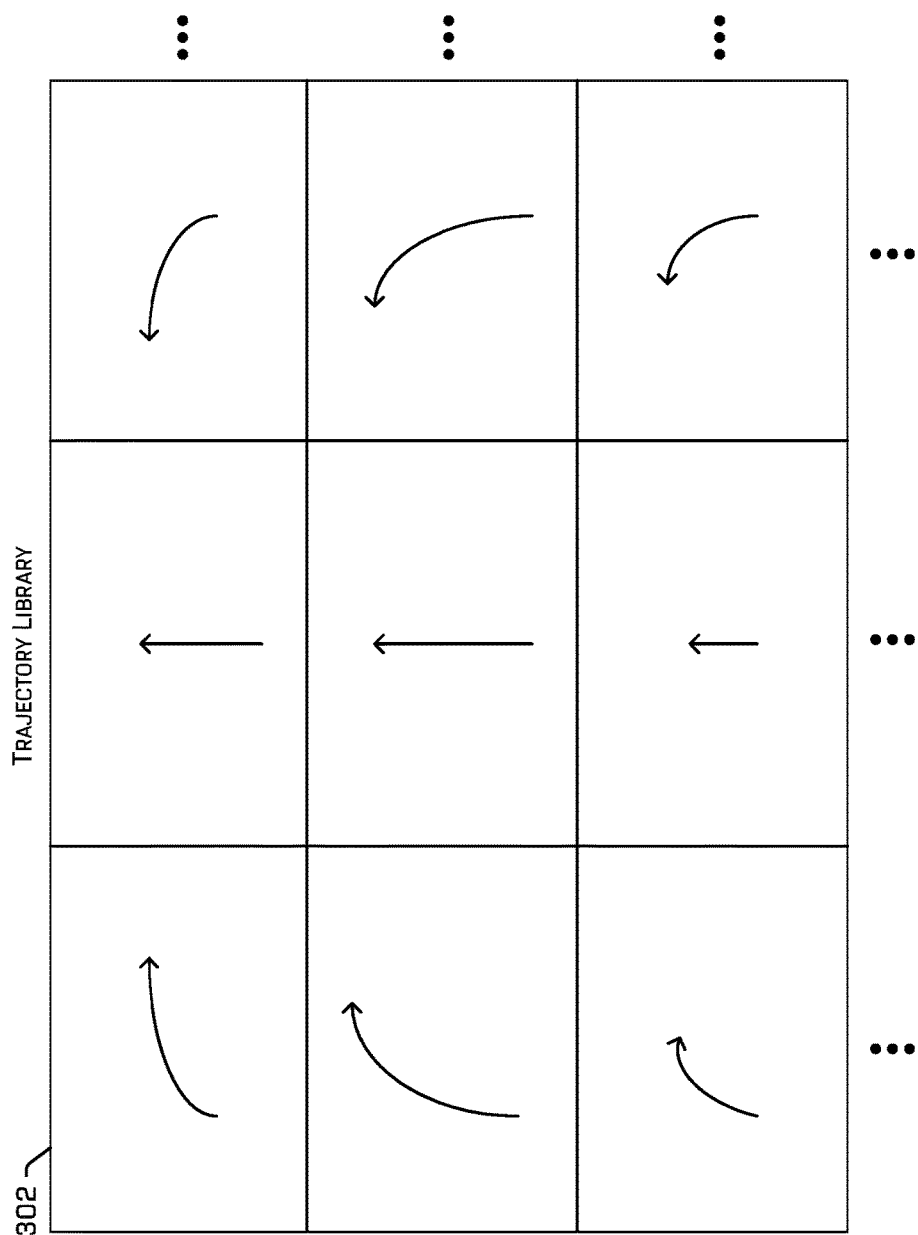
FIG. 3 is an illustration of an example architecture of a trajectory library.

FIG. 3 illustrates an example 300 of an example trajectory library 302. Example trajectory library 302 may be similar or same as the trajectory library described in association with FIG. 2. In some examples, a trajectory library may include a plurality of trajectories and/or trajectory segments. As previously mentioned, the trajectories and/or trajectory segments are from real-world log data of one or more physical vehicles traversing in a real-world environment. In some examples, the trajectory segments may be segments of whole trajectories from the log data. In some examples, a trajectory segment may be independently adjusted and instantiated in simulation. In some examples, trajectories may be combined as necessary during simulation.

Example trajectory library 302 illustrates 9 example trajectory segments. In some examples, trajectories and trajectory segments may categorized, grouped, or clustered by at least one of, but not limited to, a type of vehicle associated with the trajectory segment, a wheel base size of the vehicle associated with the trajectory segment, a type of the road associated with the trajectory segment, a condition of the road associated with the trajectory segment, a topography of the road associated with the trajectory segment, a velocity associated with the trajectory segment, maneuver type (e.g., right turn, left turn), a distant from the physical vehicle that generated the log data, environmental condition (e.g., weather condition), curvature of the trajectory segment, and the like. Example trajectory library 302 illustrates that trajectories in the columns are categorized by maneuver type. In some examples, trajectories in the rows may be categorized based on a different attribute.

Although the example trajectory library 302 illustrates only 9 trajectory segments, it can be appreciated that the trajectory library may include scores, hundreds, or thousands of types of trajectory segments. As more log data is received, trajectories can be grouped or clusters, and/or clusters can be subdivided to allow any arbitrary trajectories to be generated from the trajectory library. In some examples, the trajectory segments may be grouped or clustered using, but not limited to, hierarchical clustering, heuristics cluster, partition clustering (e.g., k-means), density-based clustering, and the like.

FIG. 4 illustrates an example computing environment 400 that may be used to implement the driving simulation systems according to the techniques described herein. The computing environment 400 may include a computing device 432 and a vehicle control system 402. In this example, the computing device 432 may instantiate and execute hybrid log-based driving simulations such as those described above in process 100 and 200 and may determine a response of the vehicle control system 402 or one or more components of vehicle control system 402 using the hybrid log-based driving simulations. The components of computing device 432 may be implemented within a single computing system, as in this example, or may be implemented in separate computer systems.

The vehicle control system 402 may include various software-based and/or hardware-based components of an autonomous vehicle, and may be used to control autonomous vehicles traversing through physical environments and/or simulated vehicles operating within virtual and/or log-based driving simulations. The vehicle control system 402 may be similar or identical to the vehicle control system 402 of first physical vehicle 106 as well as any simulated autonomous vehicles in simulation.

In this example, the vehicle control system 402 and the computing device 432 and are illustrated as discrete computing systems communicating over one or more networks 416, although in other implementations the functionality of each of the systems 402, 432, may be carried out in the same computing environment. By way of non-limiting example, software executing the functionality of the vehicle control system 402 may be uploaded or otherwise incorporated into the computing device 432 and/or software executing the computing device 432 may be uploaded to or otherwise made incorporated into the vehicle control system 402.

The vehicle control system 402 can be a hardware-based and/or software-based controller for a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In some instances, the vehicle control system 402 may operate within a real associated vehicle, such as a fully or partially autonomous vehicle having any other level or classification. In some instances, the techniques described herein for the may be usable by non-autonomous vehicles as well. Additionally and/or alternatively, the vehicle control system 402 may operate independently from any vehicle, for example, as a hardware and software-based controller for a simulated vehicle executing in a computing environment during the development, testing, and validation processes for the vehicle control system 402. In addition, while implementations of the vehicle control system 402 described herein may include simulating a control system of an autonomous vehicle, semi-autonomous vehicle, or a non-autonomous vehicle, some of the techniques may be in a simulated environment, using a simulated vehicle.

The vehicle control system 402 can be used for any configuration of real or simulated vehicles, such as, for example, a van, a sport utility vehicle, a cross-over vehicle, a truck, a bus, an agricultural vehicle, and/or a construction vehicle. For instance, the associated vehicle for the vehicle control system 402 can be powered by one or more internal combustion engines, one or more electric motors, hydrogen power, any combination thereof, and/or any other suitable power sources. Although the associated vehicle may have four wheels, the vehicle control system 402 and associated techniques described herein can be incorporated into vehicles having fewer or a greater number of wheels, and/or tires. The vehicle control system 402 can control vehicles having four-wheel steering and can operate generally with equal or similar performance characteristics in all directions, for example, such that a first end of the vehicle is the front end of the vehicle when traveling in a first direction, and such that the first end becomes the rear end of the vehicle when traveling in the opposite direction. Similarly, a second end of the vehicle is the front end of the vehicle when traveling in the second direction, and such that the second end becomes the rear end of the vehicle when traveling in the opposite direction. These example characteristics may facilitate greater maneuverability, for example, in small spaces or crowded environments, such as parking lots and/or urban areas.

The vehicle control system 402 can include a computing device(s) 404, one or more sensor system(s) 406, one or more emitter(s) 408, one or more communication connection(s) 410 (also referred to as communication devices and/or modems), at least one direct connection 412 (e.g., for physically coupling with the vehicle to exchange data and/or to provide power), and one or more drive system(s) 414. The one or more sensor system(s) 406 can be configured to capture sensor data associated with an environment.

The sensor system(s) 406 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 406 can include multiple instances of each of these or other types of sensors. For instance, the time-of-flight sensors can include individual time-of-flight sensors located at the corners, front, back, sides, and/or top of the real or simulated vehicle associated with the vehicle control system 402. As another example, the camera sensors can include multiple cameras disposed at various locations about the exterior and/or interior of the associated real or simulated vehicle. The sensor system(s) 406 can provide input to the computing device(s) 404.

The vehicle control system 402 can also include one or more emitter(s) 408 for controller the emitting of light and/or sound via the real or simulated vehicle associated with the vehicle control system 402. The one or more emitter(s) 408 in this example include interior audio and visual emitters to communicate with passengers of the vehicle. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 408 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle control system 402 can also include one or more communication connection(s) 410 that enable communication between the vehicle control system 402 and one or more other local or remote computing device(s) (e.g., a remote teleoperations computing device) or remote services. For instance, the communication connection(s) 410 can facilitate communication with other local computing device (s) on the associated real or simulated vehicle, and/or the drive system(s) 414. Also, the communication connection(s) 410 can allow the vehicle to communicate with other nearby computing device(s) (e.g., other nearby vehicles, traffic signals, etc.).

The communications connection(s) 410 can include physical and/or logical interfaces for connecting the computing device(s) 404 to another computing device or one or more external networks 416 (e.g., the Internet). For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 410 may comprise the one or more modems as described in detail above.

In at least one example, the vehicle control system 402 can include one or more drive system(s) 414. In some examples, the real or simulated vehicle associated with the vehicle control system 402 can have a single drive system 414. In at least one example, if the vehicle has multiple drive systems 414, individual drive systems 414 can be positioned on opposite ends of the associated vehicle (e.g., the front and the rear, etc.). In at least one example, the drive system(s) 414 can include one or more sensor system(s) 406 to detect conditions of the drive system(s) 414 and/or the surroundings of the vehicle. By way of example and not limitation, the sensor system(s) 406 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 414. In some cases, the sensor system(s) 406 on the drive system(s) 414 can overlap or supplement corresponding systems of the vehicle control system 402 (e.g., sensor system(s) 406).

The drive system(s) 414 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 can include a drive system controller which can receive and preprocess data from the sensor system(s) 406 and to control operation of the various vehicle systems. In some examples, the drive system controller can include one or more processor(s) and memory communicatively coupled with the one or more processor(s). The memory can store one or more modules to perform various functionalities of the drive system(s) 414. Furthermore, the drive system(s) 414 also include one or more communication connection(s) that enable communication by the respective drive system with one or more other local or remote computing device(s).

The computing device(s) 404 within the vehicle control system 402 can include one or more processor(s) 418 and memory 420 communicatively coupled with the one or more processor(s) 418. In the illustrated example, the memory 420 of the computing device(s) 404 stores a localization component 422, a perception component 424, a prediction component 426, a planning component 428, and one or more system controller(s) 430. Though depicted as residing in the memory 420 for illustrative purposes, it is contemplated that the localization component 422, the perception component 424, the prediction component 426, the planning component 428, and the one or more system controller(s) 430 can additionally, or alternatively, be accessible to the computing device(s) 404 (e.g., stored in a different component of vehicle control system 402 and/or stored remotely and accessible to the vehicle control system 402.

In memory 420 of the computing device(s) 404, the localization component 422 can include functionality to receive data from the sensor system(s) 406 to determine a position of the real or simulated vehicle associated with the vehicle control system 402. For example, the localization component 422 can include and/or request/receive a three-dimensional map of the real or simulated environment and can continuously determine a location of the autonomous vehicle within the map. In some instances, the localization component 422 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 422 can provide data to various components of the vehicle control system 402 to determine an initial position of an autonomous vehicle for generating a trajectory, as discussed herein.

The perception component 424 can include functionality to perform object detection, segmentation, and/or classification. In some examples, the perception component 424 can provide processed sensor data that indicates a presence of an entity that is proximate to the real or simulated vehicle associated with the vehicle control system 402 and/or a classification of the entity as an entity type (e.g., car, pedestrian, cyclist, building, tree, road surface, curb, sidewalk, unknown, etc.). In additional and/or alternative examples, the perception component 424 can provide processed sensor data that indicates one or more characteristics associated with a detected entity and/or the real or simulated environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The perception component 424 can include functionality to store perception data generated by the perception component 424. In some instances, the perception component 424 can determine a track corresponding to an object that has been classified as an object type. For purposes of illustration only, the perception component 424, using sensor system(s) 406 can capture one or more images of a real or simulated environment. The sensor system(s) 406 can capture images of an environment that includes an object, such as a pedestrian. The pedestrian can be at a first position at a time T and at a second position at time T+t (e.g., movement during a span of time t after time T). In other words, the pedestrian can move during this time span from the first position to the second position. Such movement can, for example, be logged as stored perception data associated with the object.

The stored perception data can, in some examples, include fused perception data captured by the vehicle. Fused perception data can include a fusion or other combination of sensor data from sensor system(s) 406, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include a track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

The prediction component 426 can generate one or more probability maps representing prediction probabilities of possible locations of one or more objects in a real or simulated environment. For example, the prediction component 426 can generate one or more probability maps for vehicles, pedestrians, animals, and the like within a threshold distance from the vehicle 402. In some instances, the prediction component 426 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 428 can determine a path for the vehicle control system 402 to direct the real or simulated vehicle through an environment. For example, the planning component 428 can determine various routes and paths and various levels of detail. In some instances, the planning component 428 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 428 can generate an instruction for guiding the autonomous vehicle along at least a portion of the route from the first location to the second location. In at least one example, the planning component 428 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 428 can alternatively, or additionally, use data from the perception component 424 to determine a path for the real or simulated vehicle associated with the vehicle control system 402 to follow to traverse through an environment. For example, the planning component 428 can receive data from the perception component 424 regarding objects associated with an environment. Using this data, the planning component 428 can determine a route to travel from a first location (e.g., a current location) to a second location (e.g., a target location) to avoid objects in an environment. In at least some examples, such a planning component 428 may determine there is no such collision free path and, in turn, provide a path which brings the vehicle to a safe stop avoiding all collisions and/or otherwise mitigating damage.

Figure 5:
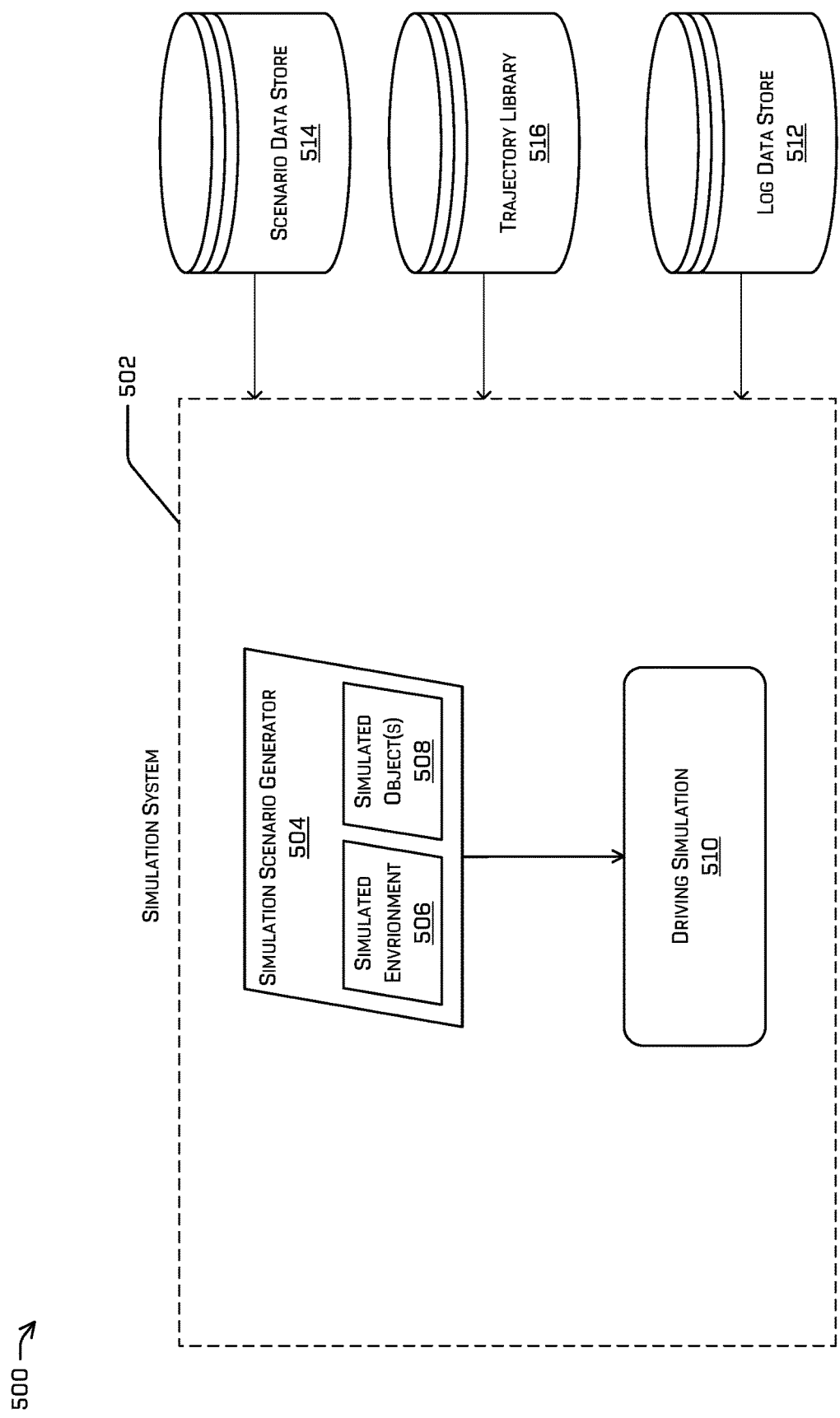
FIG. 5 is an illustration of an example architecture of a simulation system.

As discussed above, the computing device 432 may instantiate driving simulations using the various components and systems described herein to perform techniques similar or identical to those described above in processes 100 and 200. The computing device 432 may communicate/interact with one or more multiple vehicle control systems 402 to perform driving simulations in which the vehicle control systems 402 correspond to the simulated vehicle. Although not shown in this example, the computing device 432 also may include log data store(s) similar or identical to the log data store 512, and/or scenario component including simulated environments and objects similar or identical to the simulation scenario generator 504 as illustrated in FIG. 5. In some examples, log data component 438 may include a trajectory library as described herein and illustrated in FIGS. 3 and 5. In some examples, the trajectory library may be a separate component within computing device 432. In some examples, log data store(s) 512 and/or simulation scenarios, environments, and objects may be stored remotely and accessible to the computing device 432, and/or may be stored within the memory 436 of the computing device 432. Using one or more vehicle control systems 402, log data store(s) 512 and/or simulation scenarios, environments, and objects, the computing device 432 may generate, instantiate, and execute driving simulations for simulated vehicles, including monitoring and receiving responses based on the simulations from vehicle control system(s) 402.

Computing device 432 may include one or more processors 434 and memory 436 communicatively coupled with the one or more processors 434. In the illustrated example, the memory 436 of the computing device 432 stores a log data component 438, an trajectory component 440, a scenario component 442, and a simulation component 444. Though depicted in FIG. 4 as residing in the memory 436 for illustrative purposes, it is contemplated that some or all of the systems and components 438-444 may additionally, and/or alternatively, be stored remotely and accessible to the computing device 432 through networks 416.

Computing device 432 may generate and execute hybrid log-based driving simulations using similar or identical techniques to those described above in processes 100 and 200. The log data received by computing device 432 may correspond to data captured by a vehicle control system 402 within a vehicle traversing through a physical real-world environment. During a hybrid log-based driving simulation, computing device 432 may provide simulated environment and object data, based on the log data or procedurally generated using a machine learned model, to a simulated vehicle (e.g., vehicle control system 402). For instance, computing device 432 may receive and analyze the log data to detect specific objects within an environment, and the attribute data associated those objects (e.g., sizes, positions, trajectories, waypoints, or the like). The computing device 432 also may collect additional output log data associated with the vehicle simulated during the hybrid log-based driving simulation, and/or may evaluate the performance or actions of the simulated vehicle to determine a result or output of the simulation.

The log data component 438 of the computing device 432 may receive and analyze log data from a vehicle traveling within a real-world environment. For instance, the log data from may be stored and analyzed to detect objects, attribute data, trigger points, etc. Additionally or alternatively, the log data component 438 may retrieve and select log data to be used for generating hybrid log-based driving simulations. The log data component 438 and/or log data store 512 may store one or more log data. In some instances, the log data store 512 storing multiple log data from different vehicles and/or different trips or simulations may be stored within the computing device 432. In some examples, the log data component 438 also may scan log data stored in the log data store 512 and identify log data that contains an event of interest. In some instances, the log data can include event marker(s) that indicate that an event of interest is associated with a particular log data. In some instances, a user can select a log data of a set of log data to be used to generate a simulated scenario.

Trajectory component 440 within the computing device 432 can store trajectories of objects from the log data component 438. In some examples, trajectory component 440 may correspond to a trajectory library discussed in connections with FIGS. 1-3 and 5, as well as throughout this disclosure. In some examples, trajectory component 440 may be integrated with log data component 438.

The scenario component 442 can use the log data identified by the log data component 438 to generate a simulated scenario. The simulated scenario includes a simulated environment (e.g., roadways, road markers, buildings, etc.) and simulated objects (e.g., other vehicles, pedestrians, cyclists, animals, etc.). In some instances, the scenario component 442 can use the perception data generated by the perception component 424 to apply simulated object models to the simulated objects. For example, the scenario component 442 can identify a simulated vehicle model and apply it to the simulated objects associated with vehicles. In some instances, the scenario component 442 can identify a simulated pedestrian model and apply it to the simulated objects associated with pedestrians. In some instances, the simulated object models can use controllers that allow the simulated objects to react to the simulated environment and other simulated objects (e.g., modeling physics-based behaviors and incorporating collision checking). For example, a simulated vehicle object can stop at a crosswalk if a simulated pedestrian crosses the crosswalk as to prevent the simulated vehicle from colliding with the simulated pedestrian.

In some instances, the scenario component 442 can identify a simulated pedestrian model and apply it to the simulated objects associated with pedestrians. In some instances, the simulated object models can use controllers that allow the simulated objects to react to the simulated environment and other simulated objects (e.g., modeling physics-based behaviors and incorporating collision checking). For example, a simulated vehicle object can stop at a crosswalk if a simulated pedestrian crosses the crosswalk as to prevent the simulated vehicle from colliding with the simulated pedestrian.

In some examples, the log data can indicate that a particular object has a characteristic and apply that characteristic to the simulated object. For purposes of illustration only, the log data can indicate that an object travels at approximately 10 mph below the speed limit and accelerates slowly. The scenario component 442 can determine that the object is a cautious vehicle and apply a cautious object model to the corresponding simulated object in the simulated environment. In some instances, the scenario component 442 can determine, based on behavior data in the log data, that an object as an aggressive object, a passive object, a neutral object, and/or other types of behaviors and apply behavior instructions associated with the behavior (e.g., a passive behavior, a cautious behavior, a neutral behavior, and/or an aggressive behavior) to the simulated object.

In some examples, the scenario component 442 can remove objects represented in the log data from a simulated scenario based on attributes associated with the objects as determined by planning component 428. In some instances, the scenario component 442 can remove objects based on an object/classification type (car, pedestrian, motorcycle, bicyclist, etc.), an object size (e.g., length, width, height, and/or volume), a confidence level, track length, an amount of interaction between the object and a vehicle generating the log data, and/or a time period.

In some examples, the scenario component 442 can determine which objects from the log data to include within the simulated scenario based on attributes associated with the objects as determined by planning component 428. In some instances, the scenario component 442 can include objects based on an object/classification type (car, pedestrian, motorcycle, bicyclist, etc.), an object size (e.g., length, width, height, and/or volume), a confidence level, track length, an amount of interaction between the object and a vehicle generating the log data, and/or a time period.

By way of example and without limitation, the log data can include objects of varying sizes such as mailboxes and buildings. The scenario component 442 can use a volume-based filter such that objects that are associated with a volume greater equal to or greater than a threshold volume of three cubic meters, such as buildings, are represented in the simulated scenario and objects that are associated with a volume less than three cubic meters are not represented in the simulated scenario, such as the mailboxes. In some instances, the scenario component 442 can use a track length filter where objects that have track lengths (e.g., data associated with a physical distance or a period of time) that do not meet or exceed a track length threshold are filtered from the simulated scenario. This can result in a simulated scenario that omits objects associated with poor detections during the time of data capture. In some instances, the scenario component 442 can use a motion-based filter such that objects associated with motion or a trajectory according to the log data are represented in the simulated scenario. In some instances, the filters can be applied in combination or mutually exclusively.

In some examples, the scenario component 442 can filter objects that do not meet or exceed a confidence threshold. By way of example and without limitation, the log data can indicate that an object is associated with a classification attribute of a pedestrian and a confidence value of associated with the classification of 5%. The scenario component 442 can have a confidence value threshold of 75% and filter the object based on the confidence value not meeting or exceeding the confidence value threshold. In some instances, a user can provide a user-generated filter that includes one or more attribute thresholds such that the scenario component 442 can filter objects that do not meet or exceed the one or more attribute thresholds indicated by the user-generated filter.

In some examples, the scenario component 442 can determine one or more trajectory segments stored in trajectory component 440 to instantiate in a simulation. Additional details associated with the scenario component 442 determining one or more trajectory segments are discussed in FIGS. 2 and 3, as well as throughout this disclosure.

The simulation component 444 can execute the simulated scenario as a set of simulation instructions and generate simulation data. In some instances, the simulation component 444 can execute multiple simulated scenarios simultaneously and/or in parallel. This can allow a user to edit a simulated scenario and execute permutations of the simulated scenario with variations between each simulated scenario.

Additionally, the simulation component 444 can determine an outcome for the simulated scenario. For example, the simulation component 444 can execute the scenario for use in a simulation for testing and validation. The simulation component 444 generate the simulation data indicating how the vehicle control system 402 performed (e.g., responded) and can compare the simulation data to a predetermined outcome and/or determine if any predetermined rules/assertions were broken/triggered.

In some instances, the predetermined rules/assertions can be based on the simulated scenario (e.g., traffic rules regarding crosswalks can be enabled based on a crosswalk scenario or traffic rules regarding crossing a lane marker can be disabled for a stalled vehicle scenario). In some instances, the simulation component 444 can enable and disable rules/assertions dynamically as the simulation progresses. For example, as a simulated object approaches a school zone, rules/assertions related to school zones can be enabled and disabled as the simulated object departs from the school zone. In some instances, the rules/assertions can include comfort metrics that relate to, for example, how quickly an object can accelerate given the simulated scenario.

Based at least in part on determining that the vehicle control system 402 performed consistent with the predetermined outcome (that is, the autonomous controller did everything it was supposed to do) and/or determining that a rule was not broken or an assertion was not triggered, the simulation component 444 can determine that the vehicle control system 402 succeeded. Based at least in part on determining that the vehicle control system 402 performance was inconsistent with the predetermined outcome (that is, the autonomous controller did something that it wasn't supposed to do) and/or determining that a rule was broken or than an assertion was triggered, the simulation component 444 can determine that the vehicle control system 402 failed. Accordingly, based at least in part on executing the simulated scenario, simulation data can indicate how the vehicle control system 402 responds to each simulated scenario, as described above and determine a successful outcome or an unsuccessful outcome based at least in part on the simulation data.

The processor(s) 418 of the computing device(s) 404 and the processor(s) 434 of the computing device 432 can be any suitable processor capable of executing instructions to process data and perform operations as described herein. By way of example and not limitation, the processor(s) 418 and 434 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 420 of the computing device(s) 404, and the memory 436 of the computing device 432 are examples of non-transitory computer-readable media. The memory 420 and 436 can store an operating system and one or more software applications, instructions, programs, and/or data to implement the methods described herein and the functions attributed to the various systems. In various implementations, the memory 420 and 436 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, any or all of the components within the memory 420 and memory 436 can be implemented as a neural network.

FIG. 5 illustrates an example 500 of a computing architecture configured to execute a driving simulation. Example 500 includes a simulation system 502, including a simulation scenario generator 504 and a driving simulation system 510. In some examples, the simulation system 502 may be within a computing device that is the same or similar computing system and/or device as computing device 432 as illustrated in FIG. 4. In some examples, driving simulation system 510 may be depicted as separate computing systems which may operate independently in different computing environments, different hardware, different networks, or the like. In some examples, driving simulation system 510 may be implemented as different components or functionalities within the same computing system, which may be similar or identical to the components and architecture of the example computing device 432 depicted in FIG. 4. In some examples, example 500 may be used to test and/or confirm a behavior or response of a vehicle controller, one or more components of a vehicle control system, and the like.

In some examples, simulation system 502 may receive log data associated with a real vehicle traversing through a real environment such as from first physical vehicle 106 of examples 104A-C. In some examples, the log data may be stored in log data store 512. In some examples, log data store 512 maybe be integrated into a memory of simulation system 502. In some examples, log data store 512 may be a separate component from simulation system 502 such as being integrated with memory 420 or memory 436 of FIG. 4. In some examples, the log data may include raw sensor data and/or data of environmental objects based on sensor data (e.g., bounding boxes, velocities, classifications, object dimensions, predictions, object track information, control signals, position in the environment, or the like). The log data may be used by simulation scenario generator 504 to instantiate simulated environment 506 and simulated object(s) 508 within the vehicle simulation executed by driving simulation system 510.

In some examples, simulation system 502 may receive one or more trajectory segments from trajectory library 516. In some examples, trajectory library 516 may be a component within log data store 512. In some examples, simulation scenario generator 504 may aggregate log data from log data store 512 and the trajectory segment from trajectory library 516 into an aggregated log data. In some examples, simulation scenario generator 504 may instantiate the driving simulation based on the aggregated log data. In some examples, simulation scenario generator 504 may verify a kinematic profile of the aggregated log data. Additional details associated with verifying a kinematic profile are discussed in association with FIG. 1, as well as throughout this disclosure. Additional details associated with trajectory library 516 are discussed in association with FIGS. 2 and 3, as well as throughout this disclosure.

In some examples, simulation system 502 may receive synthetic data from scenario data store 514. In some examples, the synthetic data may be largely similar to log data, but may not be associated with the real vehicle traversing through the real environment, such as procedurally generated data. In some examples, the synthetic data may be utilized to instantiate simulated environment 506 and simulated object(s) 508 in the same ways that log data is used instantiate simulated environment 506 and simulated object(s) 508.

FIGS. 1, 2, 6, and 7 illustrate example processes in accordance with examples of the disclosure. These process are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

Figure 6:
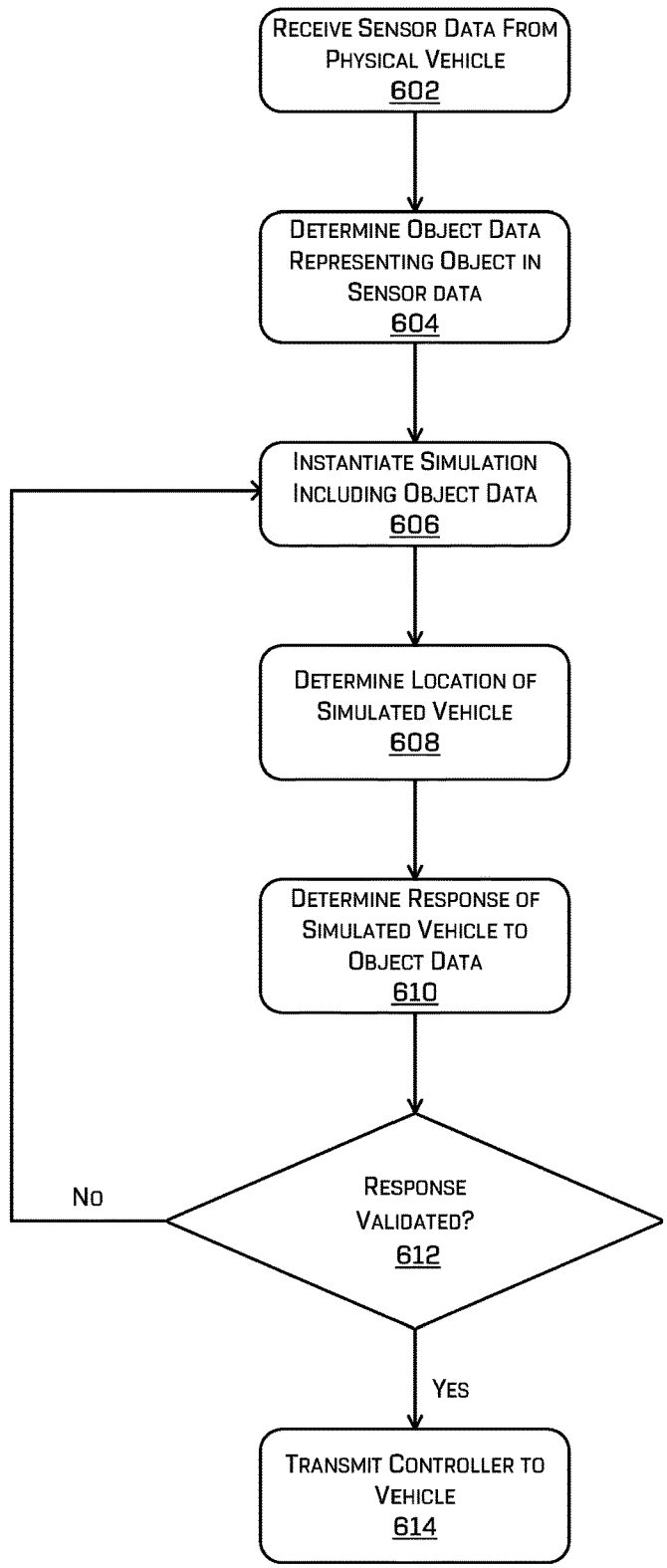
FIG. 6 is an example process of determining a response of a simulated vehicle to object data.

FIG. 6 illustrates an example process 600 of determining a response of a simulated vehicle to object data. For example, some or all of the process 600 can be performed by one or more components in FIG. 4, as described herein. For example, some or all of the process 600 can be performed by the log data component 438, the trajectory component 440, the scenario component 442, and/or the simulation component 444.

At operation 602, the process can include receiving sensor data from a physical vehicle. In some examples, the physical vehicle may be located at a first location in an environment such as at a first road segment. Additional details associated with operation 602 are discussed in connection with FIG. 1, as well as throughout this disclosure.

At operation 604, the process can include determining object data representing an object in the sensor data. Additional details associated with operation 604 are discussed in connection with FIG. 1, as well as throughout this disclosure.

At operation 606, the process can include instantiating a simulation, wherein the simulation includes the object data. In some examples, instantiating the object data may include instantiating a simulated object based on the object data. Additional details associated with operation 606 are discussed in connection with FIG. 1, as well as throughout this disclosure.

At operation 608, the process can include determining a location of a simulated vehicle instantiated in the simulation. In some examples, the simulated vehicle may be a simulated autonomous vehicle and/or a simulated autonomous vehicle controller. In some examples, the location of the simulated vehicle may be a second location different from the first location such as a second road segment different from the first road segment. Additional details associated with operation 608 are discussed in connection with FIG. 1, as well as throughout this disclosure.

At operation 610, the process can include determining a response of the simulated vehicle to the object data. Additional details associated with operation 610 are discussed in connection with FIG. 1, as well as throughout this disclosure.

At operation 612, the process can include verifying or validating the response of the simulated vehicle to the object data. In some examples, an operation of the simulated autonomous vehicle controller can be verified or validated if a safety metric is satisfied, such as a distance between the simulated vehicle and the simulated object being above a threshold, a time to collision being above a threshold, a probability of collision being below a threshold, and the like. Additional details associated with operation 612 are discussed in connection with FIG. 1, as well as throughout this disclosure. If operation 612 results in a yes, then process 600 proceeds to operation 614. If operation 612 results in a no, then process 600 reverts to operation 606.

At operation 614, upon validating the response of the simulated vehicle, the simulated autonomous vehicle controller can be transmitted to a physical autonomous vehicle such as first physical vehicle 106 as illustrated in FIG. 1. Additional details associated with operation 614 are discussed in connection with FIG. 1, as well as throughout this disclosure.

Figure 7:
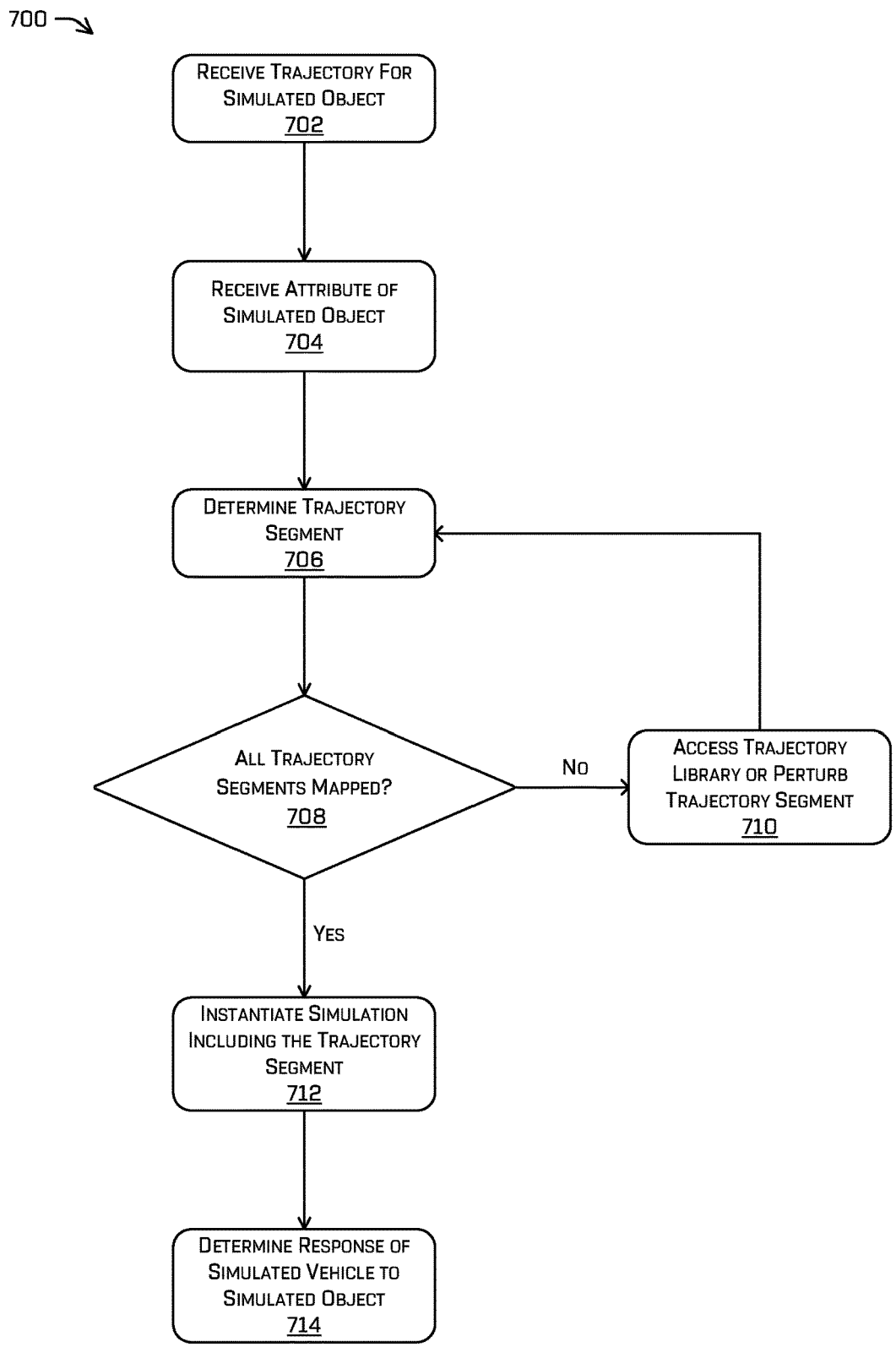
FIG. 7 is an example process of determining a response of a simulated vehicle to a simulated object.

FIG. 7 illustrates an example process 700 of determining a response of a simulated vehicle to a simulated object. For example, some or all of the process 700 can be performed by one or more components in FIG. 4, as described herein. For example, some or all of the process 700 can be performed by the log data component 438, the trajectory component 440, the scenario component 442, and/or the simulation component 444.

At operation 702, the process can include receiving a trajectory for a simulated object. In some examples, the simulated object may be a simulated vehicle in a simulated environment. Additional details associated with operation 702 are discussed in connection with FIG. 2, as well as throughout this disclosure.

At operation 704, the process can include receiving an attribute of the simulated object. Additional details associated with operation 704 are discussed in connection with FIG. 2, as well as throughout this disclosure.

At operation 706, the process can include determining a trajectory segment. In some examples, the trajectory segment may be from a trajectory library. In some examples, the trajectory library may include trajectory segments from log data of a plurality of vehicles. In some examples, the trajectory segment may be determined and/or selected from the trajectory library based on the trajectory for simulated object and the attribute of the simulated object. Additional details associated with operation 706 are discussed in connection with FIGS. 2 and 3, as well as throughout this disclosure.

At operation 708, the process can include determining whether all trajectory segments are mapped to the received trajectory from operation 702. Additional details associated with operation 708 are discussed in connection with FIGS. 2 and 3, as well as throughout this disclosure. If yes, then process 700 proceeds to operation 712. If no (e.g., the trajectory segment only makes up a part of the received trajectory or an orientation, length of the trajectory segment does not match the orientation or the length of the received trajectory, or the like), the process 700 proceeds to operation 710.

At operation 710, the process can include further accessing the trajectory library or perturbing the trajectory segment. In some examples, when the trajectory segment only makes up a part of the received trajectory (e.g., the trajectory segment is similar to first trajectory segment 214 where it makes up a part of the whole trajectory), the trajectory segment is a mismatch with the received trajectory, and the like, the process can include accessing the trajectory library to select a new trajectory segment or an additional trajectory segment to match the received trajectory. In some examples, when the length and/or the orientation of the trajectory segment needs to be adjusted to fit with the received trajectory, the trajectory segment can be perturbed so the trajectory segment fits with the received trajectory. Additional details associated with operation 708 are discussed in connection with FIGS. 2 and 3, as well as throughout this disclosure. After operation 710, process 700 reverts to operation 706.

At operation 712, the process can include instantiating a simulation including the trajectory segment. In some examples, this can include instantiating a simulated environment with the simulated object and a simulated vehicle such as a simulated autonomous vehicle. Additional details associated with operation 708 are discussed in connection with FIGS. 2 and 3, as well as throughout this disclosure.

At operation 714, the process can include determining a response of the simulated vehicle to the simulated object.

Additional details associated with operation 710 are discussed in connection with FIGS. 2 and 3, as well as throughout this disclosure.

EXAMPLE CLAUSES

A: A system comprising: one or more processors; and one or more computer-readable media storing computer-executable instructions that, when executed, cause the one or more processors to perform operations comprising: receiving sensor data captured by a physical vehicle located at a first road segment in an environment; determining object data representing an object in the sensor data; instantiating a simulated environment comprising the object data; determining a location of a simulated autonomous vehicle in the simulated environment, wherein the location is associated with a second road segment different than the first road segment; instantiating a simulated object, based at least in part on the object data, at the second road segment; and determining a response of the simulated autonomous vehicle to the simulated object.

B: The system of paragraph A, wherein the object data is determined by a perception system associated with the physical vehicle and comprises one or more of: a bounding box; velocity data; or uncertainty data.

C: The system of paragraph A or B, the operations further comprising: verifying the response of the simulated autonomous vehicle; and transmitting, based at least on verifying the response of the simulated autonomous vehicle, an autonomous vehicle controller to an autonomous vehicle in the environment.

D: The system of any of paragraphs A-C, the operations further comprising: instantiating a simulated object in the simulated environment using a first object data representing a first object trajectory and second object data representing a second object trajectory different than the first object trajectory.

E: The system of any of paragraphs A-D, wherein determining the response of the simulated autonomous vehicle comprises at least one of: determining a simulated trajectory of the simulated autonomous vehicle; determining a probability of collision; or determining a time to collision metric.

F: A method comprising: receiving sensor data captured by a vehicle in an environment, wherein the vehicle is associated with a first location; determining object data representing an object in the sensor data; instantiating a simulated environment comprising the object data; determining a second location of a simulated vehicle in the simulated environment, wherein the second location is different from the first location; and determining a response of the simulated vehicle to the object data.

G: The method of paragraph F, wherein the object data is determined by a perception system associated with the vehicle and comprises one or more of: a bounding box; velocity data; or uncertainty data.

H: The method of paragraph F or G, further comprising: verifying the response of the simulated vehicle; and transmitting a vehicle controller to the vehicle.

I: The method of any of paragraphs F-H, further comprising: instantiating a simulated object in the simulated environment using first object data representing a first real object and second object data representing a second real object different than the first real object.

J: The method of any of paragraphs F-I, wherein determining the response of the simulated vehicle comprises at least one of: determining a simulated trajectory of the simulated vehicle; determining a probability of collision; or determining a time to collision metric.

K: The method of any of paragraphs F-J, wherein the simulated vehicle comprises a planner system configured to control the vehicle.

L: The method of any of paragraphs F-K, wherein the object data represents motion of the object along a trajectory in the environment, the method further comprising: advancing the object along the trajectory in the simulated environment based at least in part on the simulated vehicle being associated with a trigger location.

M: The method of any of paragraphs F-L, wherein a first road topology associated with the object in the environment is different than a second road topology associated with the simulated environment.

N: The method of any of paragraphs F-M, wherein the object is associated with a first orientation with respect to a road in the environment and the object is associated with a second orientation with respect to a simulated road that is different than the first orientation.

O: The method of any of paragraphs F-N, wherein a first distance between the vehicle and the object in the environment is greater than a second distance between the simulated vehicle and the object in the simulated environment.

P: One or more non-transitory computer-readable media storing instructions executable by one or more processors, wherein the instructions, when executed, cause the one or more processors to perform operations comprising: receiving sensor data captured by a vehicle in an environment, wherein the vehicle is associated with a first location; determining object data representing an object in the sensor data; instantiating a simulated environment comprising the object data; determining a second location of a simulated vehicle in the simulated environment, wherein the second location is different from the first location; and determining a response of the simulated vehicle to the object data.

Q: The one or more non-transitory computer-readable media of paragraph P, the operations further comprising: verifying the response of the simulated vehicle; and transmitting a vehicle controller to the vehicle.

R: The one or more non-transitory computer-readable media of paragraph P or Q, wherein the simulated vehicle comprises a planner system configured to control the vehicle.

S: The one or more non-transitory computer-readable media of any of paragraphs P-R, wherein the object data represents motion of the object along a trajectory in the environment, the operations further comprising: advancing the object along the trajectory in the simulated environment based at least in part on the simulated vehicle being associated with a trigger location.

T: The one or more non-transitory computer-readable media of any of paragraphs P-S wherein a first road topology associated with the object in the environment is different than a second road topology associated with the simulated environment.

U: A system comprising: one or more processors; and one or more non-transitory computer-readable media storing computer-executable instructions that, when executed, cause the one or more processors to perform operations comprising: receiving a trajectory for a simulated object in a simulated environment; receiving an attribute of the simulated object; determining, based at least in part on the trajectory and the attribute, a trajectory segment in a library of trajectory segments, wherein the trajectory segment represents log data captured by a physical vehicle in an environment; generating aggregated log data including the trajectory segment; instantiating the simulated object in the simulated environment based at least in part on the aggregated log data; and determining a response of a simulated autonomous vehicle to motion of the simulated object along the trajectory in the simulated environment.

V: The system of paragraph U, the operations further comprising: clustering the log data to determine a plurality of the log data associated with at least one of: a curvature of the trajectory segment; a velocity associated with the trajectory segment; a size of an object associated with the trajectory segment; a size of a wheelbase associated with the trajectory segment; or a road topography associated with the trajectory segment.

W: The system of paragraph U or V, the operations further comprising: determining, using a controller associated with the simulated object, a cost associated with the simulated object traversing the trajectory; determining, based at least in part on the cost being above a threshold, an updated trajectory; and determining, based on the updated trajectory, a new trajectory segment in the library of trajectory segments.

X: The system of any of paragraphs U-W, wherein the attribute comprises at least one of: an object type; an object size; an object velocity; a weather condition; a road type; or a road condition.

Y: The system of any of paragraphs U-X, the operations further comprising: verifying the response of the simulated autonomous vehicle; and transmitting, based at least in part on verifying the response of the simulated autonomous vehicle, an autonomous vehicle controller to an autonomous vehicle in the environment.

Z: A method comprising: receiving an attribute associated with a simulated object in a simulated environment; determining, based at least in part on the attribute, a trajectory segment in a library of trajectory segments representing log data captured by a sensor configuration in a physical environment; instantiating the simulated environment comprising the trajectory segment; and determining a response of a simulated vehicle to the simulated object.

AA: The method of paragraph Z, the method further comprising: clustering the log data to determine a plurality of the log data associated with a characteristic of trajectory segments; and extracting the trajectory segment from the log data wherein the trajectory segment includes only data representing a physical object corresponding to the simulated object.

AB: The method of paragraph AA, wherein the characteristic of trajectory segments is at least one of: a curvature of the trajectory segment; a velocity associated with the trajectory segment; a size of an object associated with the trajectory segment; a size of a wheelbase associated with the trajectory segment; or a road topography associated with the trajectory segment.

AC: The method of any of paragraphs Z-AB, further comprising: determining, using a controller associated with the simulated object, a cost associated with the simulated object traversing the trajectory segment.

AD: The method of paragraph AC, further comprising: determining, based at least in part on the cost being above a threshold, an updated trajectory; and determining, based on the updated trajectory, a new trajectory segment in the library of trajectory segments.

AE: The method of any of paragraphs Z-AD, further comprising: verifying the response of the simulated vehicle; and transmitting a vehicle controller to a vehicle in a physical environment.

AF: The method of any of paragraphs Z-AE, further comprising: receiving a trajectory for the simulated object to follow in the simulated environment, and wherein determining the trajectory segment further comprises: adjusting, based at least in part on the trajectory, at least one of: a length of the trajectory segment; an orientation of the trajectory segment; a time interval associated with the trajectory segment; or a velocity associated with the trajectory segment.

AG: The method of any of paragraphs Z-AF, wherein the attribute comprises at least one of: an object type; an object size; an object velocity; a weather condition; a road type; or a road condition.

AH: The method of any of paragraphs Z-AG, further comprising: determining, by a simulated vehicle controller, prediction data associated with the simulated object in the simulated environment.

AI: The method of any of paragraphs Z-AH, further comprising: receiving prediction data associated with a physical object in an environment; determining a difference between the prediction data and a trajectory of the physical object in the environment; and determining, based at least on the difference exceeding a threshold, a trajectory segment associated with the trajectory of the physical object in the environment.

AJ: One or more non-transitory computer-readable media storing instructions executable by a processor, wherein the instructions, when executed, cause the processor to perform operations comprising: receiving an attribute associated with a simulated object in a simulated environment; determining, based at least in part on the attribute, a trajectory segment in a library of trajectory segments representing log data captured by a sensor configuration in a physical environment; instantiating the simulated environment comprising the trajectory segment; and determining a response of a simulated vehicle to the simulated object.

AK: The one or more non-transitory computer-readable media of paragraph AJ, the operations further comprising: clustering the log data to determine a plurality of the log data associated with a characteristic of trajectory segments; and extracting the trajectory segment from the log data wherein the trajectory segment includes only data representing a physical object corresponding to the simulated object.

AL: The one or more non-transitory computer-readable media of paragraph AK, wherein the characteristic of trajectory segments is at least one of: a curvature of the trajectory segment; a velocity associated with the trajectory segment; a size of an object associated with the trajectory segment; a size of a wheelbase associated with the trajectory segment; or a road topography associated with the trajectory segment.

AM: The one or more non-transitory computer-readable media of any of paragraphs AJ-AL, the operations further comprising: determining, using a controller associated with the simulated object, a cost associated with the simulated object traversing the trajectory segment.

AN: The one or more non-transitory computer-readable media of paragraph AM, the operations further comprising: determining, based at least in part on the cost being above a threshold, an updated trajectory; and determining, based on the updated trajectory, a new trajectory segment in the library of trajectory segments.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   one or more processors; and
   one or more computer-readable media storing computer-executable instructions that, when executed, cause the one or more processors to perform operations comprising:
      receiving sensor data captured by a physical vehicle located at a first road segment in an environment, the sensor data comprising an object located at a second road segment different from the first road segment;
      determining, based at least in part on a trajectory library, at least one trajectory segment associated with the object;
      determining that the at least one trajectory segment is mapped to a trajectory associated with the object;
      determining object data representing the object in the sensor data;
      instantiating, based at least in part on the object data, a simulated environment comprising a simulated object at the second road segment, wherein a first road topology associated with the object in the environment is different than a second road topology associated with the simulated environment and the object is associated with a first orientation with respect to a road in the environment and the object is associated with a second orientation with respect to a simulated road that is different than the first orientation;
      determining a location of a simulated autonomous vehicle in the simulated environment, wherein the location is associated with the second road segment and the simulated autonomous vehicle corresponds to the physical vehicle; and
      determining a response of the simulated autonomous vehicle to the simulated object.

2. The system of claim 1, wherein the object data is determined by a perception system associated with the physical vehicle and comprises one or more of:
   a bounding box;
   velocity data; or
   uncertainty data.

3. The system of claim 1, the operations further comprising:
   verifying the response of the simulated autonomous vehicle; and
   transmitting, based at least on verifying the response of the simulated autonomous vehicle, an autonomous vehicle controller to an autonomous vehicle in the environment.

4. The system of claim 1, the operations further comprising:
instantiating the simulated object in the simulated environment using a first object data representing a first object trajectory and second object data representing a second object trajectory different than the first object trajectory.

5. The system of claim 1, wherein determining the response of the simulated autonomous vehicle comprises at least one of:
determining a simulated trajectory of the simulated autonomous vehicle;
determining a probability of collision; or
determining a time to collision metric.

6. A method comprising:
receiving sensor data captured by a vehicle in an environment, wherein the vehicle is associated with a first location and the sensor data comprises an object associated with a second location different from the first location;
determining, based at least in part on a trajectory library, at least one trajectory segment associated with the object;
determining that the at least one trajectory segment is mapped to a trajectory associated with the object;
determining object data representing the object in the sensor data;
instantiating, based at least in part on the object data, a simulated environment comprising a simulated object at the second location, wherein a first road topology associated with the object in the environment is different than a second road topology associated with the simulated environment and the object is associated with a first orientation with respect to a road in the environment and the object is associated with a second orientation with respect to a simulated road that is different than the first orientation;
determining a third location of a simulated vehicle in the simulated environment, wherein the third location is associated with the second location and the simulated vehicle corresponds to the vehicle; and
determining a response of the simulated vehicle to the object data.

7. The method of claim 6, wherein the object data is determined by a perception system associated with the vehicle and comprises one or more of:
a bounding box;
velocity data; or
uncertainty data.

8. The method of claim 6, further comprising:
verifying the response of the simulated vehicle; and
transmitting a vehicle controller to the vehicle.

9. The method of claim 6, further comprising:
instantiating the simulated object in the simulated environment using first object data representing a first real object and second object data representing a second real object different than the first real object.

10. The method of claim 6, wherein determining the response of the simulated vehicle comprises at least one of:
determining a simulated trajectory of the simulated vehicle;
determining a probability of collision; or
determining a time to collision metric.

11. The method of claim 6, wherein the simulated vehicle comprises a planner system configured to control the vehicle.

12. The method of claim 6, wherein the object data represents motion of the object along the trajectory in the environment, the method further comprising:
advancing the object along the trajectory in the simulated environment based at least in part on the simulated vehicle being associated with a trigger location.

13. The method of claim 6, wherein a first distance between the vehicle and the object in the environment is greater than a second distance between the simulated vehicle and the object in the simulated environment.

14. One or more non-transitory computer-readable media storing instructions executable by one or more processors, wherein the instructions, when executed, cause the one or more processors to perform operations comprising:
receiving sensor data captured by a vehicle in an environment, wherein the vehicle is associated with a first location and the sensor data comprises an object associated with a second location different from the first location;
determining, based at least in part on a trajectory library, at least one trajectory segment associated with the object;
determining that the at least one trajectory segment is mapped to a trajectory associated with the object;
determining object data representing the object in the sensor data;
instantiating, based at least in part on the object data, a simulated environment comprising a simulated object at the second location, wherein a first road topology associated with the object in the environment is different than a second road topology associated with the simulated environment and the object is associated with a first orientation with respect to a road in the environment and the object is associated with a second orientation with respect to a simulated road that is different than the first orientation;
determining a third location of a simulated vehicle in the simulated environment, wherein the third location is associated with the second location, wherein the simulated vehicle corresponds to the vehicle; and
determining a response of the simulated vehicle to the object data.

15. The one or more non-transitory computer-readable media of claim 14, the operations further comprising:
verifying the response of the simulated vehicle; and
transmitting a vehicle controller to the vehicle.

16. The one or more non-transitory computer-readable media of claim 14, wherein the simulated vehicle comprises a planner system configured to control the vehicle.

17. The one or more non-transitory computer-readable media of claim 14, wherein the object data represents motion of the object along the trajectory in the environment, the operations further comprising:
advancing the object along the trajectory in the simulated environment based at least in part on the simulated vehicle being associated with a trigger location.

18. The one or more non-transitory computer-readable media of claim 14 wherein the first road topology associated with the object in the environment is different than the second road topology associated with the simulated environment.

19. The method of claim 6, wherein individual trajectory segments of the trajectory library correspond to portions of historic log data and determining that the at least one trajectory segment is mapped to the trajectory comprises linking corresponding portions of the historic log data with the trajectory.

20. The method of claim 6, wherein the trajectory associated with the object comprises multiple trajectory segments.

* * * * *